INVENTOR
PIERRE LOUIS-MARIE JAFFIER
BY
ATTORNEYS

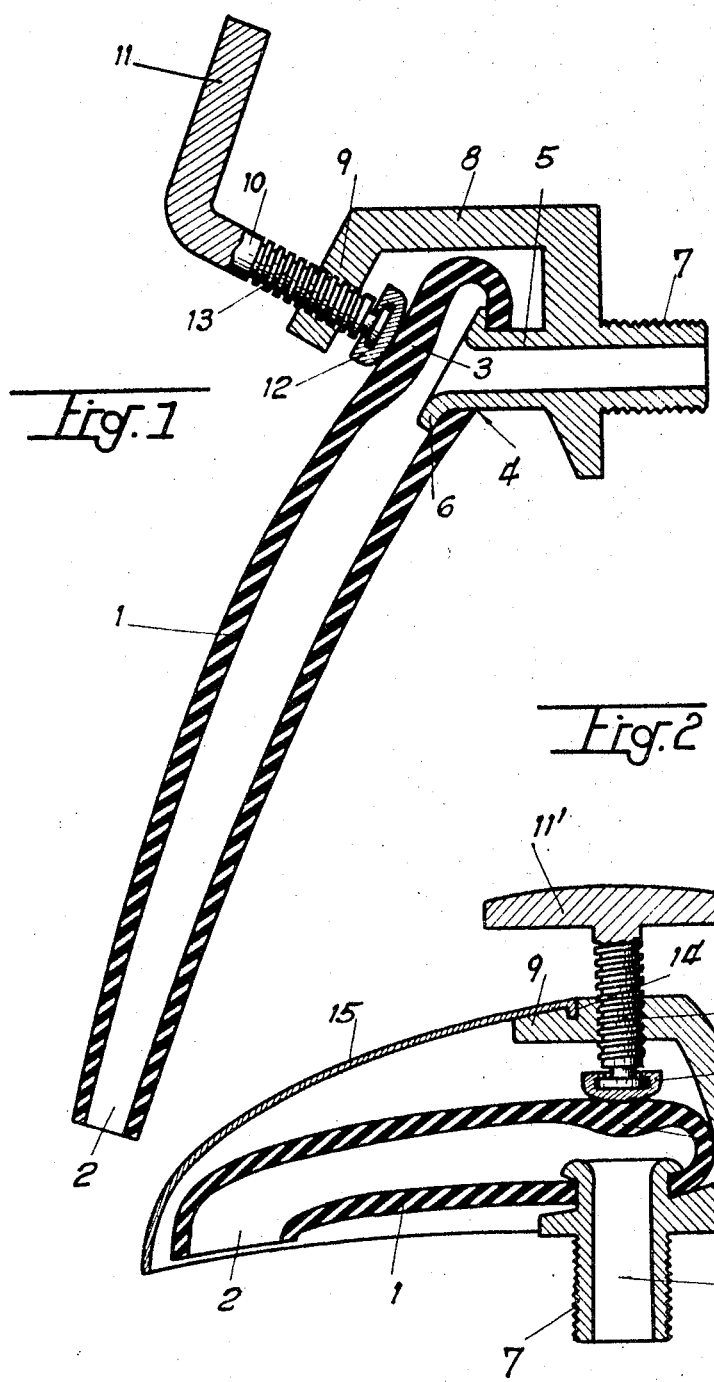

United States Patent Office 3,464,446
Patented Sept. 2, 1969

3,464,446
FAUCET
Pierre Louis-Marie Jaffier, Avignon, France, assignor to Société Industrielle d'Etudes et de Realisations Scientifiques S.I.E.R.S., a corporation of France, Paris, France
Filed Jan. 5, 1966, Ser. No. 518,857
Int. Cl. F16k 7/06; F16l 55/14
U.S. Cl. 137—606                                5 Claims

ABSTRACT OF THE DISCLOSURE

A faucet construction having a tube-like flexible member with spaced inlet and outlet openings. A pipe has a discharge end received into the inlet opening and provided with a valve seat. The pipe is connected to a support member which has actuating means for urging a portion of the flexible member against the valve seat to prevent the flow of a fluid through the discharge opening of the pipe.

---

The present invention relates to an improved faucet of the type comprising a flexible member which ensures both the supply of fluid from at least one opening of a segment of rigid pipe against which said flexible member is applied and the stoppage of the fluid by external pressure means for producing the deformation of said flexible member.

The manufacture of faucets of this type calls for a large number of parts which must be machined separately, then assembled. Such faucets are therefore expensive to produce and also require the services of specialists for repair and maintenance purposes. Finally, leak-tightness in the direction of flow of fluid as well as with respect to the exterior of the pipe is not always ensured in a correct manner.

The object of the present invention is to overcome the disadvantages noted above and, to this end, is directed to a faucet of the type indicated in the foregoing and characterized in that the opening of said faucet or each opening thereof form a valve seating against which the external pressure means applies in the active position a portion of said flexible member which is in oppositely facing relation thereto. The number of parts which are necessary for the construction of the faucet as well as the number of zones in which leak-tightness has to be ensured are thus reduced to a considerable extent. Maintenance of the apparatus is also facilitated inasmuch as all the control members thereof are located at the exterior.

As an advantageous feature, the portion of flexible member which cooperates with the seating or with each seating is provided with an overthickness. This simple arrangement increases the leak-tightness and length of life of the apparatus.

According to one improvement, the seating or each seating is constituted by a flared rim which forms the end of the pipe segment. This arrangement improves the leak-tightness and length of life of the apparatus and, in addition, facilitates the clamping of the flexible member against the opening.

According to a further improvement, the pipe segment or each pipe segment as well as the member which support the pressure means form a single part on which a decorative cover can be fitted. The number of components of the faucet in accordance with the invention is accordingly reduced.

In accordance with yet another improvement, in order to form a mixing faucet, two openings adapted to cooperate with two external pressure means are so designed as to form part of a single component.

A clear understanding of the invention will in any case be gained by consideration of the following description, reference being made therein to the accompanying drawings in which three forms of embodiment of the invention are shown by way of example and not in any limiting sense, and in which:

FIG. 1 is a longitudinal central sectional view showing one form of embodiment of a faucet in accordance with the invention.

FIG. 2 is a longitudinal central sectional view showing another form of embodiment of a faucet in accordance with the invention.

Figure 3:
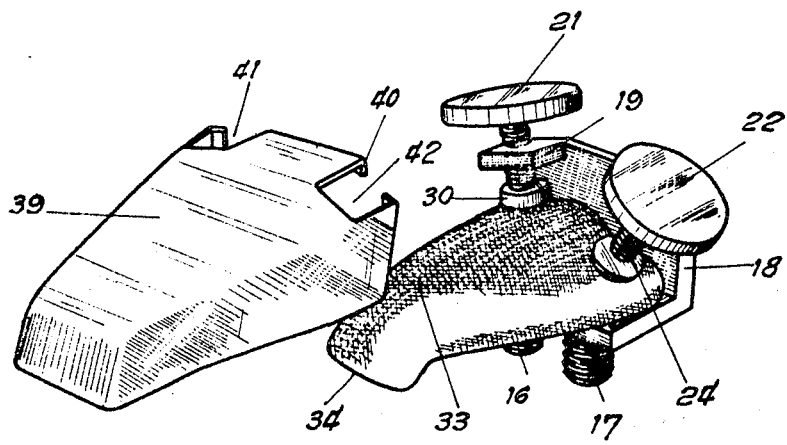
FIG. 3 is an exploded view in perspective which shows yet another alternative form of embodiment of a faucet according to the invention; and, FIG. 4 is a transverse sectional view of the faucet which is shown in FIG. 3.

The faucet which is illustrated in FIG. 1 is made up of a tube-like flexible member 1, for example of rubber, which forms a jet deflector for the fluid which flows through said flexible member and is discharged through its outlet 2.

The flexible member 1 is provided at the top portion thereof with an overthickness 3 in oppositely-facing relation to an opening 4 which has been tightly applied as a result of elastic deformation against a pipe segment 5, directly behind a flared opening 6 which is thus located opposite the overthickness 3. The pipe segment 5 which can be provided with a threaded end 7 for connection purposes is formed in one piece with an overhung support member or bracket 8, the front flange 9 of which is parallel to the opening 6 and fitted with an operating stem 10 and handle 11 terminating in a plug 12 which is mounted with slight play on the head of the stem and designed to be moved either towards or away from the opening 6 by virtue of the screw-thread 13 of the stem which engages with a corresponding screw-thread of the flange 9.

It will be readily apparent that, in the position which is shown in FIG. 1, the fluid flows from the pipe segment 5 towards the fluid outlet 2 by way of the opening 6.

On the contrary, if the overthickness 3 is applied by the plug 12 against the opening 6 as a result of rotation of the stem 10, the passage of fluid is thus cut off.

It will be noted that leak-tightness with respect to the exterior can be made fully effective if necessary by means of a fastening-collar or any similar device for clamping the opening 4 against the pipe segment 5. Thus, the main disadvantage of conventional faucets and cocks is in any case circumvented inasmuch as fluid-tightness does not have to be afforded at the point at which the threaded portion 13 of the operating stem passes through the flange 9. The screw-thread can therefore be machined to a fairly wide tolerance, thus avoiding any danger of seizure and ensuring very smooth operation.

Finally, it will be noted that the number of components of the faucet is particularly small, with the result that its cost price is extremely reasonable.

The faucet which is illustrated in FIG. 2 differs in general design from the faucet which is shown in FIG. 1 only in the relative orientation of the pipe segment 5 with respect to the jet discharge outlet 2. The same elements have therefore been designated by the same reference numerals with the exception of the operating member 11' which is shown here in the form of a control knob.

In addition, a decorative cover-plate 15 which is intended to conceal the flexible member 1 has been fitted in a groove 14 of the flange 9.

Figure 4:
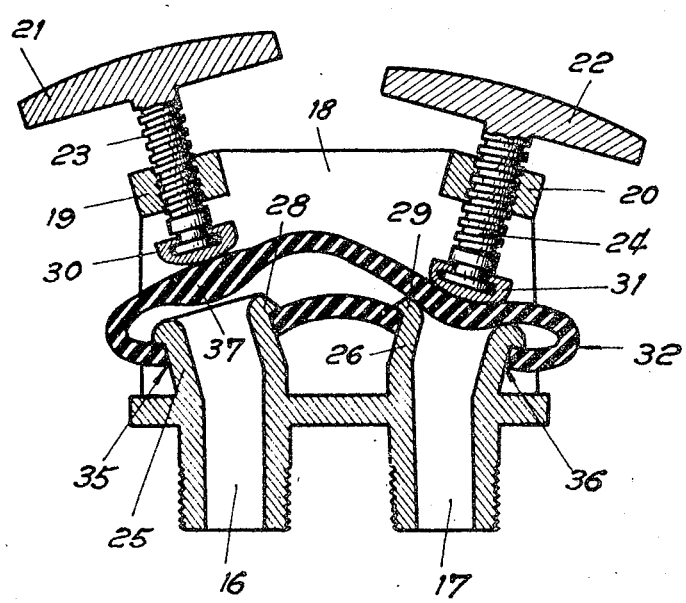

The faucet in accordance with FIGS. 3 and 4 is also generally similar to the faucet which is shown in FIG. 2. In this case, however, provision is made for two parallel pipe segments 16–17 which are intended to be connected, for example, to hot and cold water pipes. Said two pipe segments are formed in one piece with a bracket 18 which is provided with two flanges 19 and 20, said flanges being slightly inclined so that the operating knobs 21 and 22 which form the ends of the threaded stems 23 and 24 are located at a sufficient distance from each other. For this reason, the ends 25 and 26 of the pipe segments 16 and 17 have been made slightly divergent, with the result that the openings 28 and 29 are located opposite the plugs 30 and 31.

The flexible member 32 is threrefore provided with a convergent portion 33 which terminates at the fluid discharge outlet 34 and the enlarged end of which is provided with two openings 35 and 36 in oppositely facing relation to two overthicknesses 37 and 38.

Finally, the decorative plate 39 which is shaped for the purpose of covering the flexible member 32 is fastened by means of its rear flanges 40 behind the bracket 18, two cutout portions 41 and 42 being provided for the flanges 19 and 20.

It can be understood without difficulty that the faucet as thus exemplified operates in the same manner as those which are illustrated in FIGS. 1 and 2, the proportion of cold or hot water which is discharged from the outlet 34 being dependent on the positions in which the operating handles 21, 22 are set.

It will in any case be apparent that the forms of embodiment which have been described in reference to the accompanying drawings have been given solely by way of example without implied limitation and that a large number of modifications can be devised without thereby departing either from the scope or the spirit of the invention.

What I claim is:

1. A faucet construction comprising:

a tube-like flexible member having an elongated passageway and having spaced inlet and outlet openings in communication with said passageway, said inlet opening being located in the side of said flexible member;

pipe means having a discharge opening in one end thereof and adapted to supply fluid therethrough, said one end of said pipe means being received within said inlet opening in sealing engagement with said flexible member, and said one end of said pipe means having a rigid portion defining a valve seat in surrounding relationship to said discharge opening;

pressure means interconnected to and movable with respect to said pipe means, said pressure means being adapted to apply a force to the external surface of a portion of said flexible member on the opposite side from said inlet opening whereby said portion is pressed against said valve seat in sealing engagement therewith for preventing flow of fluid through the discharge opening into said passageway.

2. A faucet construction as defined in claim 1, wherein one end of said pipe means has an enlarged flared rim with said one end extending through the inlet opening formed in said flexible member, said flared end being larger in diameter than the inlet opening whereby when said enlarged flared rim is positioned within the passageway contained within said flexible member, it resists disconnection of said flexible member from said pipe means.

3. A faucet construction as defined in claim 2, further including a bracket member and wherein said pipe means comprises a pipe segment fixedly connected directly to said bracket member.

4. A faucet construction as defined in claim 6, further including support means connecting said pipe means to said pressure means, and wherein said pressure means includes an actuating portion adapted to contact said portion of said flexible member for moving same into sealing engagement with said valve seat and a handle portion mounted on said support means for angular movement with respect thereto, angular movement of said handle portion causing said actuating portion to move said flexible member against said valve seat for closing said discharge opening.

5. A faucet construction comprising:

a tube-like flexible member having an elongated passageway and having spaced inlet and outlet openings in communication with said passageway;

pipe means having a discharge opening in one end thereof and adapted to supply fluid therethrough, said one end of said pipe means being received within said inlet opening in sealing engagement with said flexible member, and said one end of said pipe means having a portion defining a valve seat in surrounding relationship to said discharge opening;

pressure means interconnected to and movable with respect to said pipe means, said pressure means being adapted to apply a force to the external surface of a portion of said flexible member whereby said portion is pressed against said valve seat in sealing engagement therewith for preventing flow of fluid through the discharge opening into said passageway;

said pipe means including two pipe segments each provided with a discharge opening therein and adapted to supply fluid therethrough, said flexible member having two separate inlet openings therein in communication with said passageway with each one of said pipe segments being received within one of the respective inlet openings in sealing engagement with said flexible member, each of said pipe segments having a valve seat on the end thereof in surrounding relationship to said discharge opening, and said pressure means coacting with said flexible member for causing sealing engagement of said flexible member with either of the valve seats formed on said pipe segments for permitting flow of fluid through either or both of said discharge openings, whereby said faucet construction permits a mixing of the flow from said two discharge openings.

References Cited

UNITED STATES PATENTS

| 1,605,765 | 11/1926 | Papin | 251—331 X |
| 1,935,971 | 11/1933 | Wuesthoff | 137—606 X |
| 2,099,841 | 11/1937 | Connell | 251—8 X |
| 2,519,448 | 8/1950 | Fairchild | 137—607 X |

FOREIGN PATENTS 558,606    1/1944    Great Britain.

WILLIAM F. O'DEA, Primary Examiner

DENNIS H. LAMBERT, Assistant Examiner

U.S. Cl. X.R.

137—525, 801; 251—8